United States Patent
Otto et al.

(10) Patent No.: US 10,267,406 B2
(45) Date of Patent: Apr. 23, 2019

(54) INSEPARABLE MACHINED LUBRICANT MANIFOLD

(71) Applicant: United Technologies Corporation, Hartford, CT (US)

(72) Inventors: John R. Otto, Middletown, CT (US); Stephanie M. Baker, East Hampton, CT (US); James B. Coffin, Windsor, CT (US)

(73) Assignee: United Technologies Corporation, Farmington, CT (US)

(*) Notice: Subject to any disclaimer, the term of this patent is extended or adjusted under 35 U.S.C. 154(b) by 497 days.

(21) Appl. No.: 14/902,018

(22) PCT Filed: Jul. 3, 2014

(86) PCT No.: PCT/US2014/045335
§ 371 (c)(1),
(2) Date: Dec. 30, 2015

(87) PCT Pub. No.: WO2015/047514
PCT Pub. Date: Apr. 2, 2015

(65) Prior Publication Data
US 2016/0369884 A1 Dec. 22, 2016

Related U.S. Application Data

(60) Provisional application No. 61/843,428, filed on Jul. 7, 2013.

(51) Int. Cl.
*F02C 7/06* (2006.01)
*F02K 3/06* (2006.01)
(Continued)

(52) U.S. Cl.
CPC ......... *F16H 57/0424* (2013.01); *F01D 25/18* (2013.01); *F02C 7/06* (2013.01);
(Continued)

(58) Field of Classification Search
CPC ....... F05D 2260/40311; F05D 2260/98; F01D 25/18; F02C 7/36; F02C 7/06
(Continued)

(56) References Cited

U.S. PATENT DOCUMENTS 4,449,426 A * 5/1984 Younger ............. F16H 61/0009
                                                          137/884
4,951,709 A * 8/1990 Kirkham ............... F15B 13/081
                                                          137/269
(Continued)

FOREIGN PATENT DOCUMENTS

EP    1703174 A1    9/2006
EP    2538055 A2    12/2012

OTHER PUBLICATIONS

International Preliminary Report on Patentability for International Application No. PCT/US2014/045335 dated Jan. 21, 2016.
(Continued)

*Primary Examiner* — Henry Y Liu
(74) *Attorney, Agent, or Firm* — Carlson, Gaskey & Olds, P.C.

(57) ABSTRACT

A lubricant manifold for gear system of a turbofan engine includes a base plate defining an inlet, an outlet and a plurality of open channels. The open channels define a portion of a corresponding plurality of lubricant passages. A cover plate is attached to the base plate to complete the formation of the plurality of lubricant passages. An interlocking interface between the base plate and the cover plate secures the cover plate to the base plate.

17 Claims, 5 Drawing Sheets

(51) Int. Cl.
  *F01D 25/18*  (2006.01)
  *F16H 57/04*  (2010.01)
  *F04D 29/063* (2006.01)

(52) U.S. Cl.
  CPC .............. *F02K 3/06* (2013.01); *F04D 29/063* (2013.01); *F05D 2220/36* (2013.01); *F05D 2230/60* (2013.01); *F05D 2240/30* (2013.01); *F05D 2260/36* (2013.01); *F05D 2260/40311* (2013.01); *F05D 2260/98* (2013.01)

(58) Field of Classification Search
  USPC ....................................................... 184/6.12
  See application file for complete search history.

(56) References Cited

U.S. PATENT DOCUMENTS

| | | | | |
|---|---|---|---|---|
| 5,513,604 | A * | 5/1996 | Clement | F01L 1/46 123/90.38 |
| 6,644,250 | B1 * | 11/2003 | Kantola | F01M 1/08 123/196 R |
| 7,771,884 | B2 * | 8/2010 | Haltiner, Jr. | H01M 8/028 429/458 |
| 7,861,827 | B2 * | 1/2011 | Madge | F16C 33/6659 184/6.12 |
| 8,215,454 | B2 * | 7/2012 | Portlock | F01D 25/18 184/6.11 |
| 8,246,503 | B2 * | 8/2012 | Sheridan | F02C 7/06 184/6.12 |
| 8,307,804 | B2 * | 11/2012 | Ohta | F01M 1/06 123/196 R |
| 8,381,878 | B2 * | 2/2013 | DiBenedetto | F01D 25/18 184/6.11 |
| 8,857,149 | B1 * | 10/2014 | Muldoon | F02C 7/06 184/6.11 |
| 9,970,527 | B2 * | 5/2018 | Smith | F16H 57/046 |
| 2003/0021503 | A1 * | 1/2003 | Branagan | F16C 17/06 384/303 |
| 2005/0086941 | A1 * | 4/2005 | Bunel | F23R 3/20 60/761 |
| 2006/0213572 | A1 * | 9/2006 | Beaulieu | F16L 59/024 138/155 |
| 2010/0105516 | A1 * | 4/2010 | Sheridan | F01D 25/18 475/346 |
| 2012/0088624 | A1 * | 4/2012 | Sheridan | F01D 25/16 475/159 |
| 2013/0287553 | A1 * | 10/2013 | Coffin | F02K 3/06 415/175 |
| 2014/0090930 | A1 * | 4/2014 | James | F01D 25/20 184/6.11 |
| 2016/0010549 | A1 * | 1/2016 | McCune | F02C 7/06 60/805 |
| 2016/0025205 | A1 * | 1/2016 | Smith | F16H 57/046 184/6.12 |
| 2016/0091080 | A1 * | 3/2016 | Craft | F16H 57/046 184/6.12 |
| 2016/0208651 | A1 * | 7/2016 | Dolman | F01D 25/20 |
| 2016/0273385 | A1 * | 9/2016 | Otto | F01D 25/18 |
| 2016/0297042 | A1 * | 10/2016 | Koik | B23Q 11/1046 |
| 2016/0377165 | A1 * | 12/2016 | Sheridan | F16H 57/0486 60/226.1 |

OTHER PUBLICATIONS

International Search Report and Written Opinion for International Application No. PCT/US2014/045335 dated Apr. 20, 2015.
European Search Report for EP Application No. 14849382.8 dated Feb. 16, 2017.

* cited by examiner

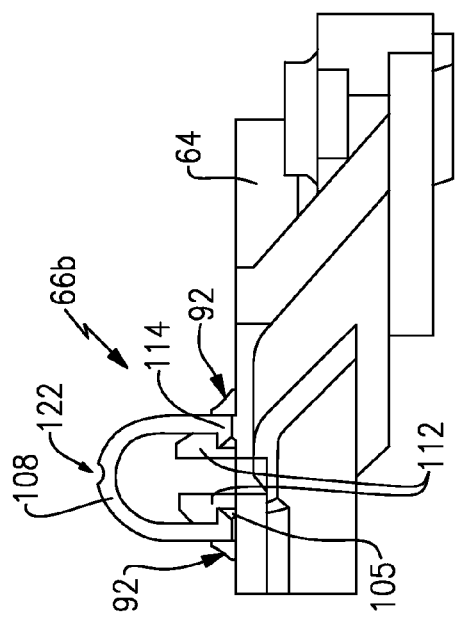
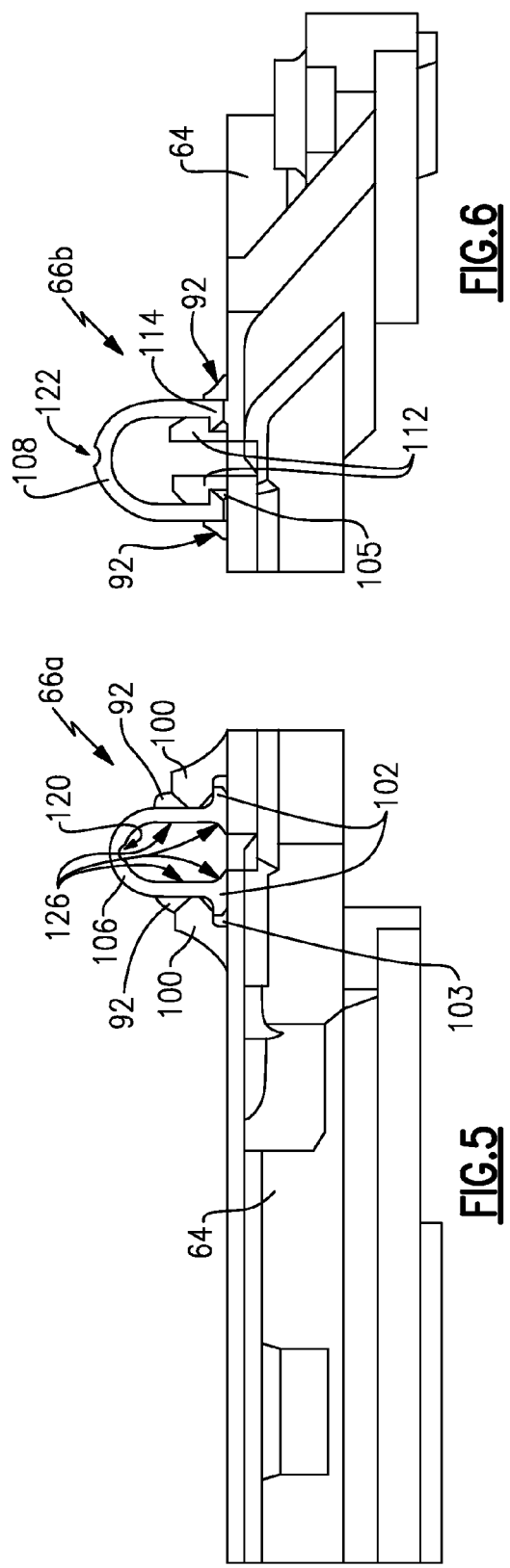
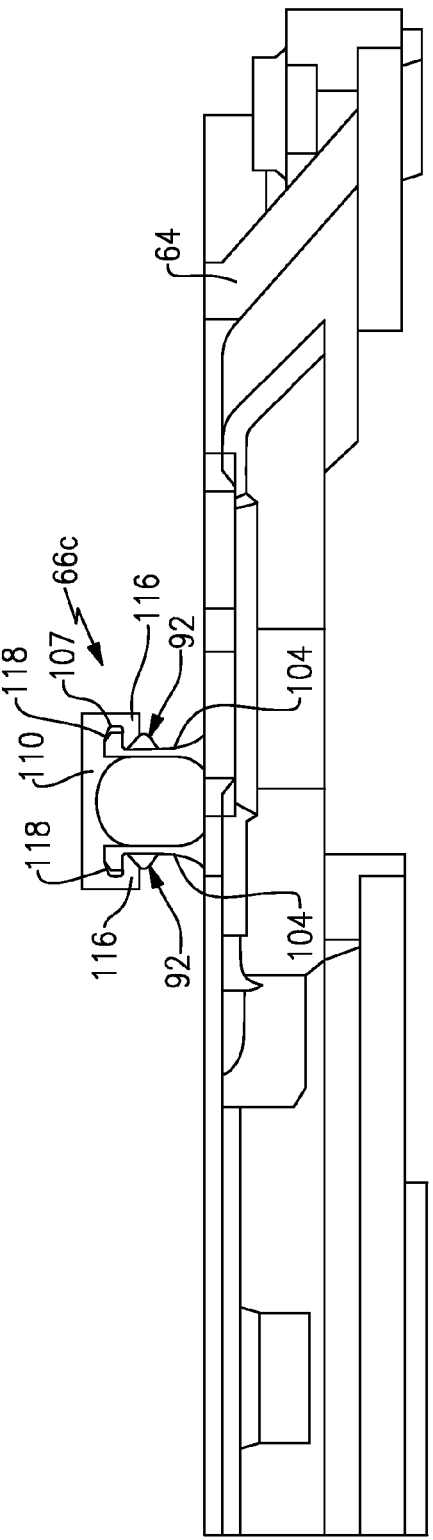

INSEPARABLE MACHINED LUBRICANT MANIFOLD

REFERENCE TO RELATED APPLICATION

This application claims priority to U.S. Provisional Application No. 61/843,428 filed on Jul. 7, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. An oil manifold includes passages to deliver lubricant to different locations of the gear assembly. The passages within the oil manifold are formed as castings utilizing complex, time consuming and costly coring and finish machining processes.

Turbine engine manufacturers continue to seek improvements to engine performance and manufacture including improvements to assembly and manufacture of component parts.

SUMMARY

A lubricant manifold for gear system of a turbofan engine according to an exemplary embodiment of this disclosure, among other possible things includes a base plate defining an inlet, an outlet and a plurality of open channels defining a first portion of a corresponding lubricant passage. A cover plate is configured for attachment to the base plate, the cover plate forming a second portion of the corresponding lubricant passage. An interlocking interface secures the cover plate to the base plate.

In a further embodiment of the foregoing lubricant manifold, the interlocking interface includes at least one tab defined on one of the base plate and the cover plate and at least one hook engaged to the at least on tab on the other of the base plate and the cover plate.

In a further embodiment of any of the foregoing lubricant manifolds, the at least on tab and at least one hook include a plurality of tabs engageable with a corresponding plurality of hooks.

In a further embodiment of any of the foregoing lubricant manifolds, the plurality of hooks and plurality of tabs are disposed at intervals along the open channels.

In a further embodiment of any of the foregoing lubricant manifolds, the interlocking interface includes a plurality of hooks defined on the cover plate and a plurality of tabs defined on the base plate.

In a further embodiment of any of the foregoing lubricant manifolds, the plurality of tabs are defined by flanges extending from the base plate along the plurality of open channels defining the lubricant passages.

In a further embodiment of any of the foregoing lubricant manifolds, includes a weld joint between the cover plate and the base plate forming a lubricant seal.

In a further embodiment of any of the foregoing lubricant manifolds, the cover plate includes a plurality of cover plates each defining a separate lubricant passage and separately attached to the base plate.

A fan drive gear system for a turbofan engine according to an exemplary embodiment of this disclosure, among other possible things includes a geared architecture including a plurality of intermeshing gears defining a speed change ratio, and a lubricant manifold directing a flow of lubricant to the geared architecture. The lubricant manifold includes a base plate defining an inlet, an outlet and an open channel defining a first portion of a corresponding lubricant passage, a cover plate attached to the base plate to define a second portion of the lubricant passage, and an interlocking interface for securing the cover plate to the base plate.

In a further embodiment of the foregoing fan drive gear system, the interlocking interface includes at least one tab defined on one of the base plate and the cover plate and at least one hook engaged to the at least on tab on the other of the base plate and the cover plate.

In a further embodiment of any of the foregoing fan drive gear systems, the at least on tab and at least one hook include a plurality of tabs engageable with a corresponding plurality of hooks.

In a further embodiment of any of the foregoing fan drive gear systems, the interlocking interface includes a plurality of hooks defined on the cover plate and a plurality of tabs defined on the base plate.

In a further embodiment of any of the foregoing fan drive gear systems, the plurality of hooks and plurality of tabs are disposed at intervals along the open channels.

In a further embodiment of any of the foregoing fan drive gear systems, includes a weld joint between the cover plate and the base plate forming a lubricant seal.

In a further embodiment of any of the foregoing fan drive gear systems, the cover plate includes a plurality of cover plates each defining a separate lubricant passage and separately attached to the base plate.

A method of assembling a lubricant manifold according to an exemplary embodiment of this disclosure, among other possible things includes positioning a base plate to include an inlet, an outlet and a first portion of a lubricant passage, and attaching a cover plate to the base plate to define a second portion of the lubricant passage at an interlocking interface. The interlocking interface includes a tab defined on one of the base plate and the cover plate and a hook engaged to the tab on the other of the base plate and the cover plate.

In a further embodiment of the foregoing method, includes the step of welding an interface between the base plate and the cover plate to form a lubricant seal.

In a further embodiment of any of the foregoing methods, the hook is on the cover plate and the tabs are on the base plate.

In a further embodiment of any of the foregoing methods, the tabs include a plurality of tabs defined by flanges extending from the base plate and spaced at intervals along a periphery of the lubricant passage, and hooks comprise a plurality of hooks on the cover plate engaged to corresponding plurality of tabs when attaching the cover plate to the base plate.

Although the different examples have the specific components shown in the illustrations, embodiments of this disclosure are not limited to those particular combinations.

It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 5 is another cross-sectional view of an example lubricant manifold.

FIG. 6 is another cross-sectional view of an example lubricant manifold.

FIG. 7 is another cross-sectional view of an example lubricant manifold.

DETAILED DESCRIPTION

Figure 1:
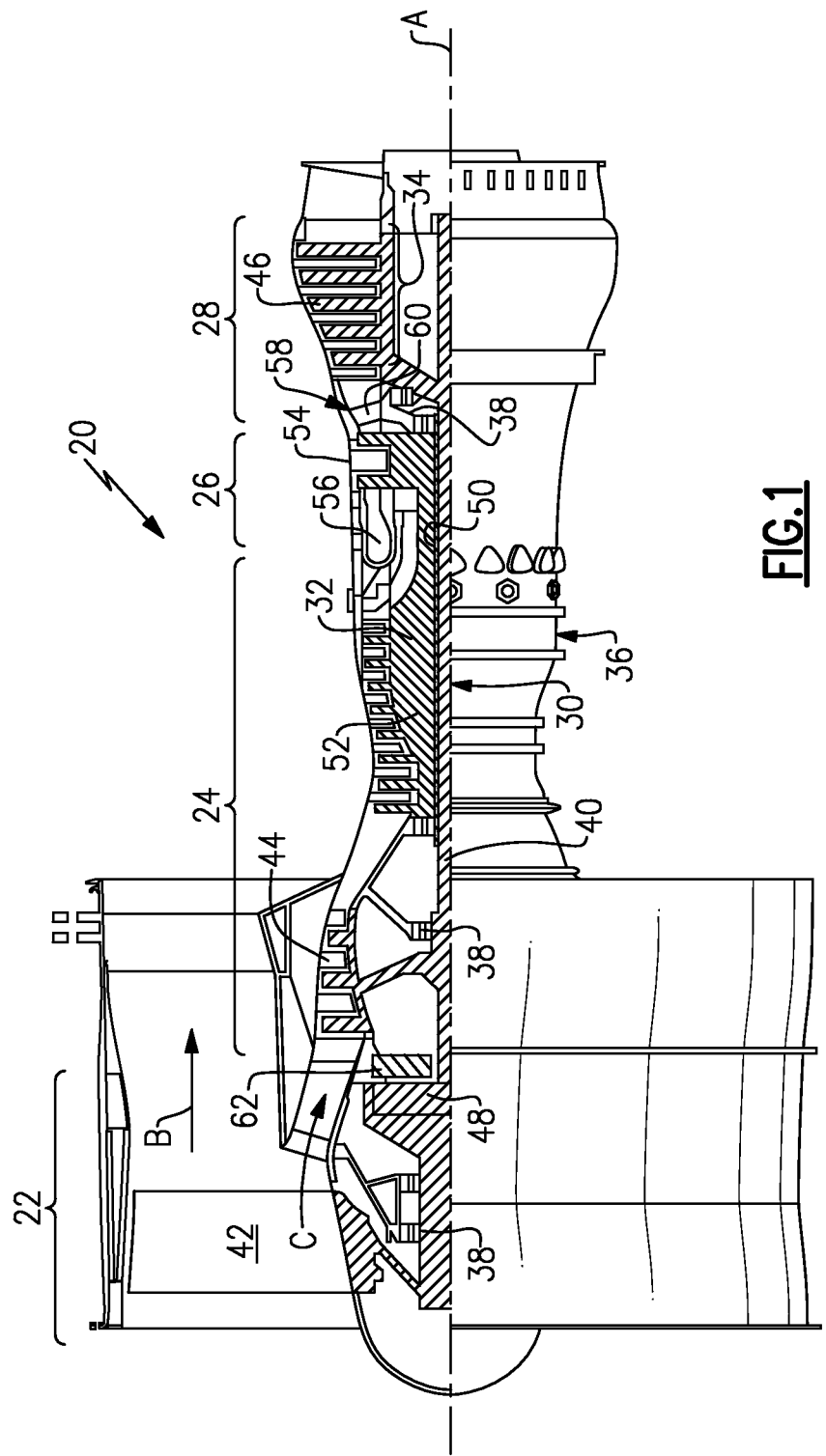
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\,°R)/(518.7\,°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
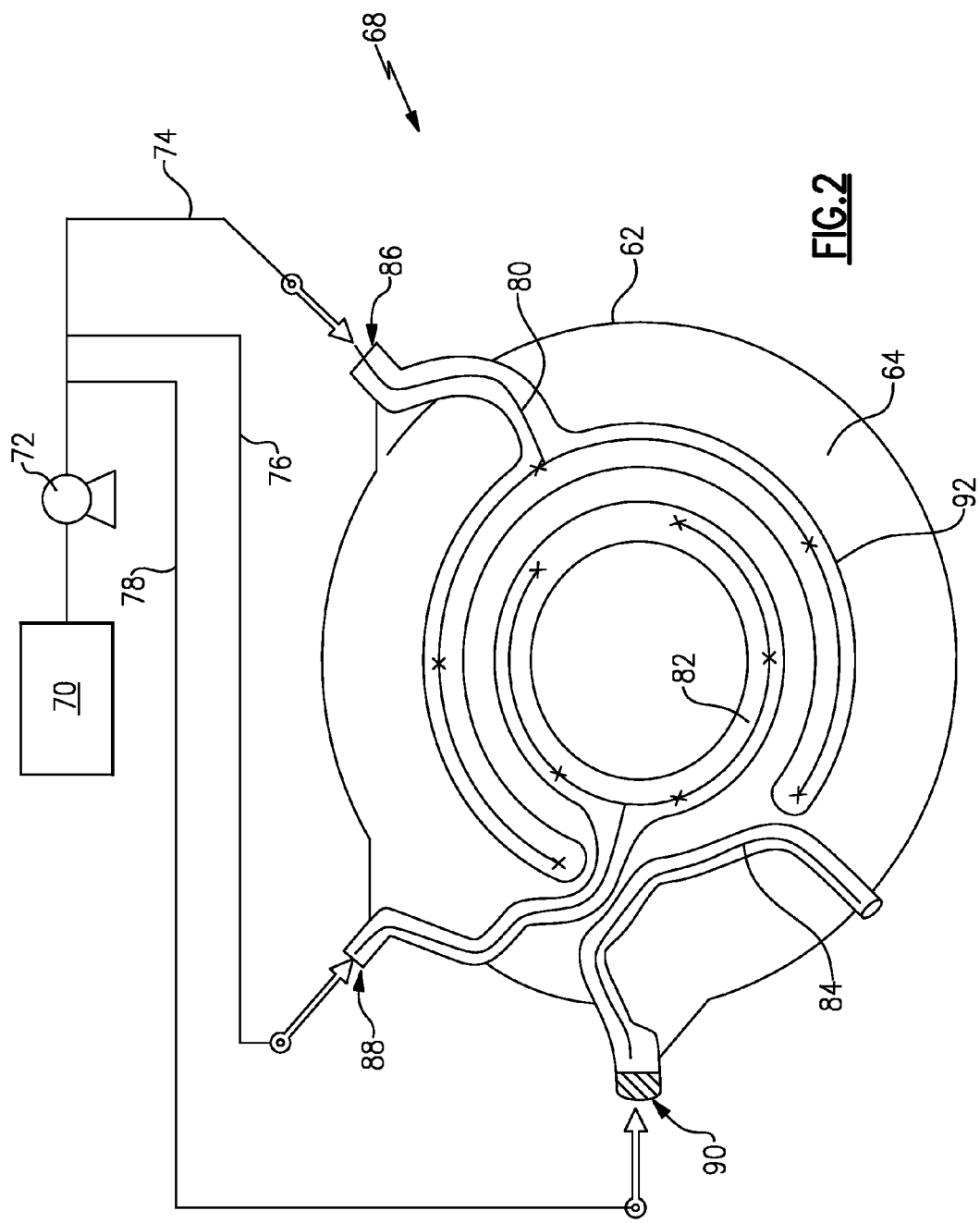
FIG. 2 is a schematic view of an example lubrication system including a lubricant manifold.

Referring to FIG. 2 with continued reference to FIG. 1, the example gas turbine engine 20 includes a lubrication system 68 that includes a lubricant source 70, a pump 72, and first, second and third lubricant circuits 74, 76, and 78. The pump 72 pumps lubricant through the circuits 74, 76, 78, to a lubricant manifold 62. The lubricant manifold 62 supplies lubricant to different locations within the geared architecture to provide lubricant to for example, gears, journal bearings, or other features within the geared architecture at different pressures and/or temperatures. The example lubricant manifold 62 includes three individual and separate circuits that correspond with different features and structures of the geared architecture 48.

The lubricant manifold 62 includes first, second and third cover plates 80, 82 and 84 attached to a common base plate 64. The base plate 64 defines first, second and third inlets 86, 88 and 90 that correspond to the lubricant circuits 74, 76 and 78. The first, second and third cover plates 80, 82, and 84 form portions of the corresponding first, second and third lubricant circuits 74, 76, and 78. In this example, a first cover plate 80, a second cover plate 82, and a third cover plate 84 are all attached to the base plate 64. Each of the cover plates 80, 82 and 84 correspond and cooperate with features on the base plate 64 to define the portions of the lubricant passages through the lubricant manifold 62.

Figure 3:
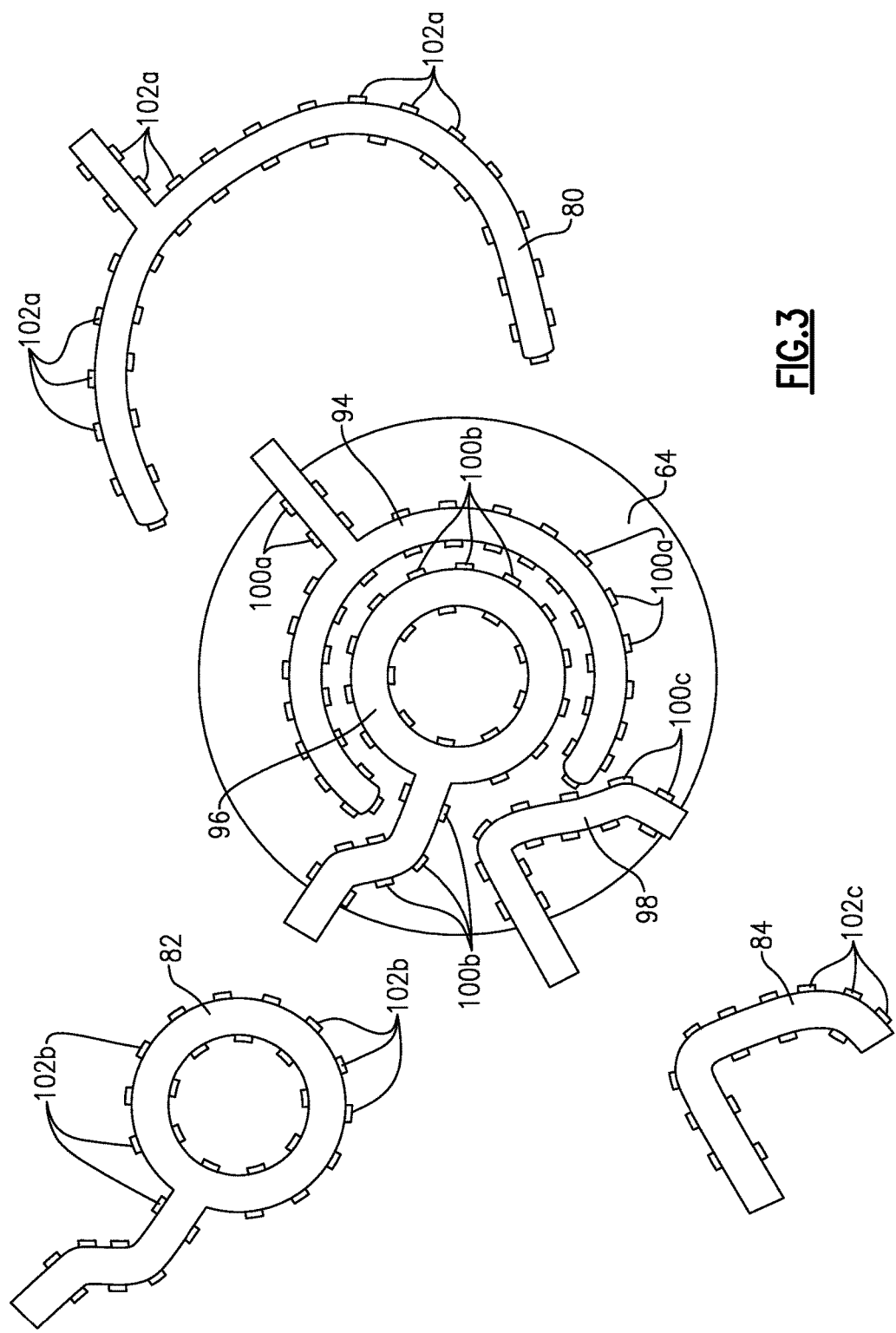
FIG. 3 is an exploded view of the example lubricant manifold.

Referring to FIG. 3, with continued reference to FIG. 2, the base plate 64 includes a first channel 94 that defines a first portion of the first lubricant circuit 74 that cooperates with the first cover plate 80. The lubricant manifold 64 further includes a second channel 96 that cooperates with the second cover plate 82 to define a first portion of the second lubricant circuit 76. A third cover plate 84 corresponds with a third channel 98 partially defined on the base plate 64 to form a first portion of the third lubricant circuit 78.

Each of the channels 94, 96 and 98 includes a series of attachment features that form an interlocking interface between the cover plates 80, 82 and 84 and the base plate 64. The cover plates 80, 82, and 84 define second portions of the lubricant circuits 74, 76, and 78. The interlocking interface includes a first set of attachment features 100a-c defined on the base plate 64 and a second set of corresponding attachment features 102a-c defined on each of the corresponding cover plates 80, 82, and 84.

Each of the cover plates 80, 82, and 84 are secured to the base plate 64 by interlocking the first and second sets of locking features 100a-c and 102a-c on the corresponding cover plates 80. In this example, the base plate 64 includes a plurality of tabs 100a-c and each of the cover plates 80, 82, and 84 include a plurality of hooks 102a-c that engage corresponding tabs 100a-c that are defined within the base plate 64. The interlocking interfaces are spaced apart and disposed at intervals about the respective channels 94,96 and 98 such that they form a plurality of separate interlocking features that are engaged when one of the cover plates is assembled to the base plate 64.

Figure 4:
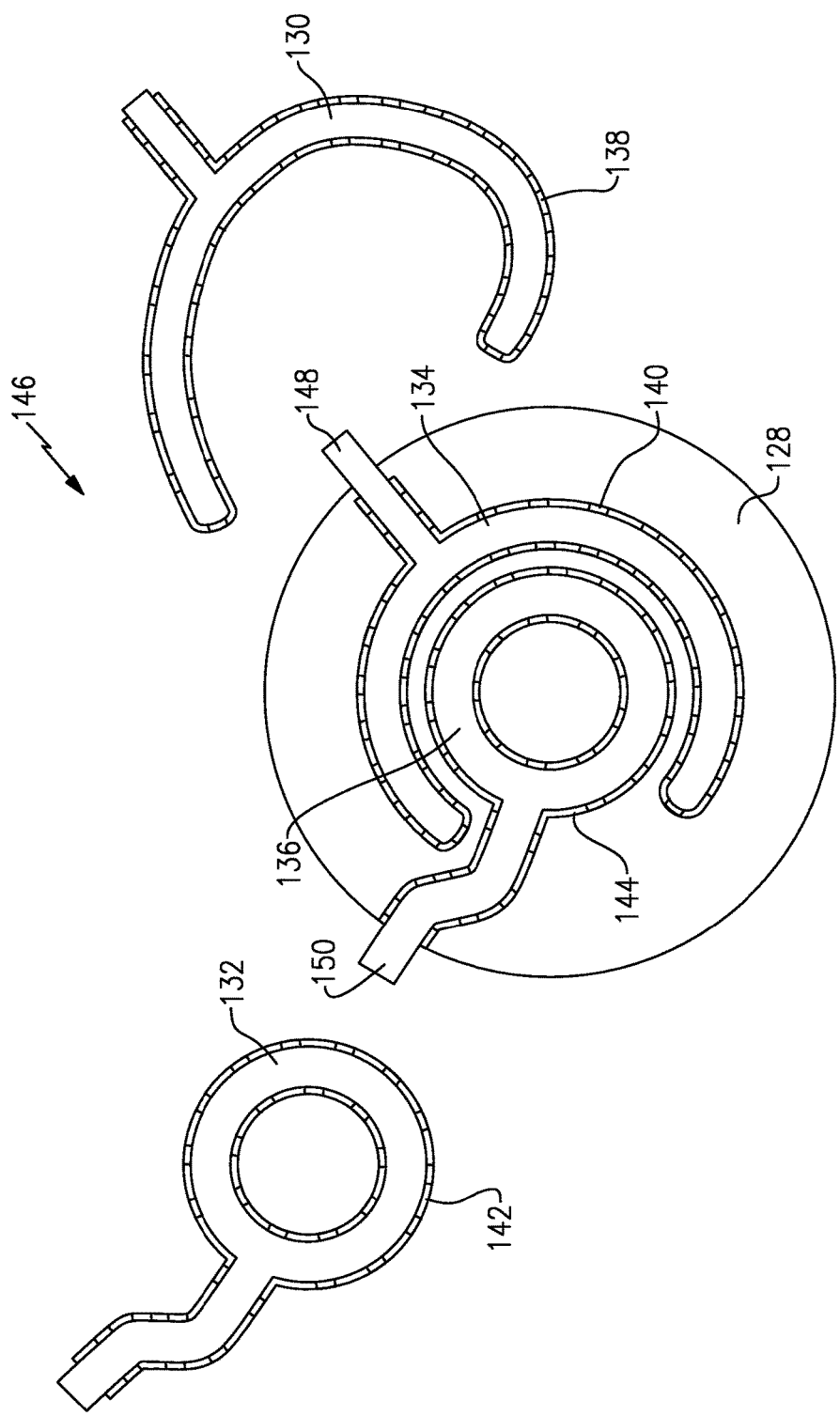
FIG. 4 is a cross-section of an example lubricant manifold.

Referring to FIG. 4, another lubricant manifold 146 includes a base plate 128 that defines parts of first and second lubricant circuits 134, 136 and first and second inlets 148, 150. The lubricant circuits 134, 136 are completed by assembly of a first cover plate 130 and a second cover plate 132 to the base plate 128. An interlocking interface is provided that mechanically secures each of the cover plates 130, 132 to the base plate 128. The interlocking interface includes a first portion 138 on the first cover plate 130 and a second portion 140 on the base plate 128.

In this example, the first portion 138 and the second portion 140 are continuous features disposed along the periphery of the corresponding first lubricant circuit 134. The interlocking interface for the second cover plate 132 includes a first portion 142 that engages a second portion 144 defined on the base plate 128. The first and second portions 142 and 144 are both defined continuously on either side of the corresponding second lubricant circuit 136. The first portions 138, 142 mechanically lock into corresponding second portions 140 and 144 defined on the base plate 128. The first and second cover plates 130, 132 lock onto the base plate 128 to complete the corresponding first and second lubricant circuits 134 and 136.

Referring to FIGS. 5, 6 and 7 with continued reference to FIGS. 3 and 4, the interlocking interface for each of the example lubricant manifolds 62, 146 includes features that provide a mechanical lock and securement of the cover plate to the corresponding base plate. The interlocking features may be spaced at intervals as is shown in FIG. 3, or define a continuous feature about the periphery of each lubricant circuit as is shown in FIG. 4. Moreover, although three cover plates are shown in one example manifold 62 and two shown in the other example manifold 146, any number and combination of cover plates are within the contemplation of this disclosure.

Referring to FIGS. 5, 6 and 7 with reference to the lubricant manifold 62 illustrated in FIGS. 2 and 3, the example base plate 64 is illustrated including different configurations of interlocking interfaces 66a, 66b, and 66c. Each of the interlocking interfaces 66a, 66b and 66c are defined by cooperating cross-sections of cover plate and base plate 64. As appreciated, each lubricant manifold example 128 and 146 may include any of the disclosed interlocking interface configurations. The lubricant manifold 62 is explained by way of example. Each of the cover plates 80, 82 and 84 may include any of the disclosed cross-sections that correspond with a disclosed interlocking interface 66a, 66b and 66c.

Referring to FIG. 5, the first interlocking interface 66a includes tabs 100 on the base plate 64 and hooks 102 formed as part of a cover plate 106. The hooks 102 engage the tabs 100 to secure the cover plate 106 to the base plate 64. The hooks 102 are received within slots 103 defined by the tabs 100. The tabs 100 are flanges that extend from a surface of the base plate 64. The tabs 100 define the slots 103 that receive the hooks 102 of the corresponding cover plate 106. The cover plate 106 includes a notched portion 120 that accommodates bending for assembly to the base plate 64. Compression of the cover plate 106 provides for initial movement of the hooks 102 past the tabs 100 and into the corresponding slots 103.

Referring to FIG. 6, a second example interlocking interface 66b includes tabs 112 that extend upward from the base portion 64. The tabs 112 define an outer slot 105 that receives a hook 114 defined on a cover plate 108. The cover plate 108 includes a notch 122 accommodating outward movement of ends of the cover plate 108 as it is assembled over the tabs 112. The hooks 114 of the cover plate 108 bend outward around the tabs 112 and then spring back into the slots 105 formed under the tabs 112.

Referring to FIG. 7, a third interlocking interface 66c includes upward extending flanges 104 that include hooks 118. The upward extending flanges 104 extend upward from the base plate 64 and include the hooks 118. The cover plate 110 is substantially flat and includes tabs 116 that fit over and onto the hooks 118. The hooks 118 are flexible inward and therefore are compressed inwardly until being received within slots 107 defined within the cover plate 110.

Referring to FIGS. 5, 6, and 7, each of the interlocking interfaces 66a, 66b, and 66c, once the cover plate 106, 108, and 110 is snapped and secured into place, a weld joint 92 is formed at the interface between the cover plate 106,108, and 110 and base plate 64. The weld joint 92 is continuous about the interface between the cover plate 106,108, and 110 and base plate 64 to form a lubricant seal to maintain lubricant under pressure within the defined passages. Although a weld joint 92 is disclosed by way of example, other bonding material could also be utilized within the contemplation of this disclosure.

The interlocking interfaces 66a and 66b include a cover plate configuration that utilizes pressure indicated by arrows 126 caused by lubricant charges, pressure, and fluid flow within the defined passages to aid in maintaining sealing contact. As appreciated, pressure 126 will force the inner walls of the corresponding cover plate 106, 108, or flanges 104 outwardly. The first interlocking interface geometry therefore generates forces utilizing the pressure 126 to push against the corresponding features in the mating part to further secure and maintain the desired lubricant seal.

The example lubricant manifold provides for the separate definition and formation of lubricant passages while eliminating the need to provide separate sealing features such as O-rings or other seals that require tight tolerances and expensive and time consuming machining. Moreover, once the cover plates are joined to the base plates through the weld joint, the lubricant manifold becomes a one piece assembly such that each of the cover plates are inseparable and maintain the desired sealing function against lubricant pressure and flow. Accordingly, the example lubricant manifold provides an assembly that provides for simplified assembly and machining while maintaining the integrity and the desired lubricant flow passages.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A lubricant manifold for gear system of a turbofan engine comprising:
    a base plate defining an inlet, an outlet and a plurality of open channels defining a first portion of a corresponding lubricant passage;
    a cover plate configured for attachment to the base plate, the cover plate forming a second portion of the corresponding lubricant passage; and
    an interlocking interface for securing the cover plate to the base plate, wherein the interlocking interface includes at least one tab defined on one of the base plate and the cover plate and at least one hook engaged to the at least one tab on the other of the base plate and the cover plate.

2. The lubricant manifold as recited in claim 1, wherein the at least one tab and at least one hook include a plurality of tabs engageable with a corresponding plurality of hooks.

3. The lubricant manifold as recited in claim 2, wherein the plurality of hooks and plurality of tabs are disposed at intervals along the open channels.

4. The lubricant manifold as recited in claim 2, wherein the plurality of hooks are defined on the cover plate and the plurality of tabs are defined on the base plate.

5. The lubricant manifold as recited in claim 3, wherein the plurality of tabs are defined by flanges extending from the base plate along the plurality of open channels defining the lubricant passages.

6. The lubricant manifold as recited in claim 1, including a weld joint between the cover plate and the base plate forming a lubricant seal.

7. The lubricant manifold as recited in claim 1, wherein the cover plate comprises a plurality of cover plates each defining a separate lubricant passage and separately attached to the base plate.

8. A fan drive gear system for a turbofan engine comprising
    a geared architecture including a plurality of intermeshing gears defining a speed change ratio; and
    a lubricant manifold directing a flow of lubricant to the geared architecture, the lubricant manifold including a base plate defining an inlet, an outlet and an open channel defining a first portion of a corresponding lubricant passage, a cover plate attached to the base plate to define a second portion of the lubricant passage, and an interlocking interface for securing the cover plate to the base plate, wherein the interlocking interface includes at least one tab defined on one of the base plate and the cover plate and at least one hook engaged to the at least one tab on the other of the base plate and the cover plate.

9. The fan drive gear system as recited in claim 8, wherein the at least one tab and at least one hook include a plurality of tabs engageable with a corresponding plurality of hooks.

10. The fan drive gear system as recited in claim 9, wherein the plurality of hooks are defined on the cover plate and the plurality of tabs are defined on the base plate.

11. The fan drive gear system as recited in claim 10, wherein the plurality of hooks and plurality of tabs are disposed at intervals along the open channels.

12. The fan drive gear system as recited in claim 8, including a weld joint between the cover plate and the base plate forming a lubricant seal.

13. The fan drive gear system as recited in claim 8, wherein the cover plate comprises a plurality of cover plates each defining a separate lubricant passage and separately attached to the base plate.

14. A method of assembling a lubricant manifold comprising:
positioning a base plate to include an inlet, an outlet and a first portion of a lubricant passage; and
attaching a cover plate to the base plate to define a second portion of the lubricant passage at an interlocking interface, wherein the interlocking interface includes a tab defined on one of the base plate and the cover plate and a hook engaged to the tab on the other of the base plate and the cover plate.

15. The method as recited in claim 14, including the step of welding an interface between the base plate and the cover plate to form a lubricant seal.

16. The method as recited in claim 14, wherein the hook is on the cover plate and the tabs are on the base plate.

17. The method as recited in claim 16, wherein the tabs comprise a plurality of tabs defined by flanges extending from the base plate and spaced at intervals along a periphery of the lubricant passage, and hooks comprise a plurality of hooks on the cover plate engaged to corresponding plurality of tabs when attaching the cover plate to the base plate.

\* \* \* \* \*